United States Patent [19]
Anderson

[11] Patent Number: 5,367,537
[45] Date of Patent: Nov. 22, 1994

[54] SAW-BASED FSK MODULATING CIRCUIT
[75] Inventor: Fred J. Anderson, Lakeville, Ohio
[73] Assignee: Delco Electronics Corp.
[21] Appl. No.: 65,336
[22] Filed: May 24, 1993
[51] Int. Cl.$^5$ ............................................ H04L 27/12
[52] U.S. Cl. ..................................... 375/65; 332/102; 455/113
[58] Field of Search ..................... 375/62–65; 455/113; 332/100, 101, 102; 328/59, 60; 331/74, 75

[56] References Cited
U.S. PATENT DOCUMENTS

| | | | |
|---|---|---|---|
| 3,188,568 | 6/1967 | Monachesi | 375/63 |
| 3,319,168 | 5/1967 | Olson | 375/63 |
| 4,573,025 | 2/1986 | McKinzie, III | 331/117 D |
| 4,682,344 | 7/1987 | Somer | 375/62 |
| 4,684,853 | 8/1987 | Coash | 318/16 |
| 5,010,585 | 4/1991 | Garcia | 375/62 |
| 5,136,264 | 8/1992 | Nardozza | 332/102 |

Primary Examiner—Stephen Chin
Assistant Examiner—Hai H. Phan
Attorney, Agent, or Firm—Vincent A. Cichosz; Mark A. Navarre

[57] ABSTRACT

A frequency shift keying modulating circuit produces a first frequency according to a surface acoustic wave transducer natural resonant frequency and a second frequency according to the surface acoustic wave in combination with a reactive element. The frequency selected is determined by the state of a PIN switching diode in parallel with the reactive element.

1 Claim, 1 Drawing Sheet

SAW-BASED FSK MODULATING CIRCUIT

BACKGROUND OF THE INVENTION

This invention relates generally to a radio frequency transmitter. More specifically, the invention is related to a low power transmitter having particular utility for use in a remote keyless entry, alarm or similar system for a motor vehicle.

A remote system for a motor vehicle has a base unit in a vehicle and a remote unit carried by the operator. A remote unit is typically low power battery operated and quite small, designed about the size of keychain. Such remote units are generally configured to at least transmit a stream of binary data utilizing known radio frequency transmission modulation techniques. The most common technique utilized in this application is Amplitude Shift Keying (ASK). Experience has shown that ASK may exhibit performance limitations in certain radio frequency hostile environments resulting in reduced range and noise immunity.

One type of alternate radio frequency modulation technique which proves more robust than ASK is Frequency Shift Keying (FSK). Problematic of prior art FSK circuitry is frequency drift and limited separation of generated carrier frequencies. Commonly employed varactor diode frequency pulling techniques yield less than the full frequency separation range possible, exhibits temperature instability characteristic of solid state electronics and requires precise control of a reverse bias voltage applied thereto. Other techniques make use of a multiplicity of reactive element circuit paths for frequency pulling but likewise tend to be temperature drift sensitive and accomplish less than the full range of potential frequency separation. Multiple circuit paths and related switching circuitry reduce overall reliability and increase overall cost due to circuital complexity.

SUMMARY

One of the objects of the present invention is to provide for a transmitter having improved noise immunity characteristics relative to ASK methods currently utilized in the art. Another object is to carry out such a scheme in the most low cost and highly reliable fashion possible by using only the minimal number of components. Yet another object is to provide for a modulation scheme which utilizes minimal power which is fully applicable to a battery operated unit. A further object of the invention is to provide for a wide deviation in frequency between a first and second transmission frequency corresponding to binary data transmission in a FSK modulating transmitter.

The invention is carried out in a low-power requirement FSK modulating circuit which has an oscillator amplifier tuned for RF oscillation and responsive to an oscillatory input thereto. A Surface Acoustic Wave (SAW) transducer having a natural resonant frequency in a stand alone oscillatory configuration provides a first frequency for the FSK modulating circuit. A single reactive component located between the SAW transducer and the RF oscillator amplifier provides a pulling effect upon the SAW natural resonant frequency so as to change the oscillatory frequency input to the RF oscillator amplifier to a second frequency. A PIN switching diode in parallel with the reactive component provides a bypass of that reactive component such that the SAW transducer provides its natural resonant frequency as an input to the RF oscillator amplifier. Means for forward and reverse biasing the PIN diode provides selective control over these two independent frequencies.

DETAILED DESCRIPTION OF THE INVENTION

Figure 1:
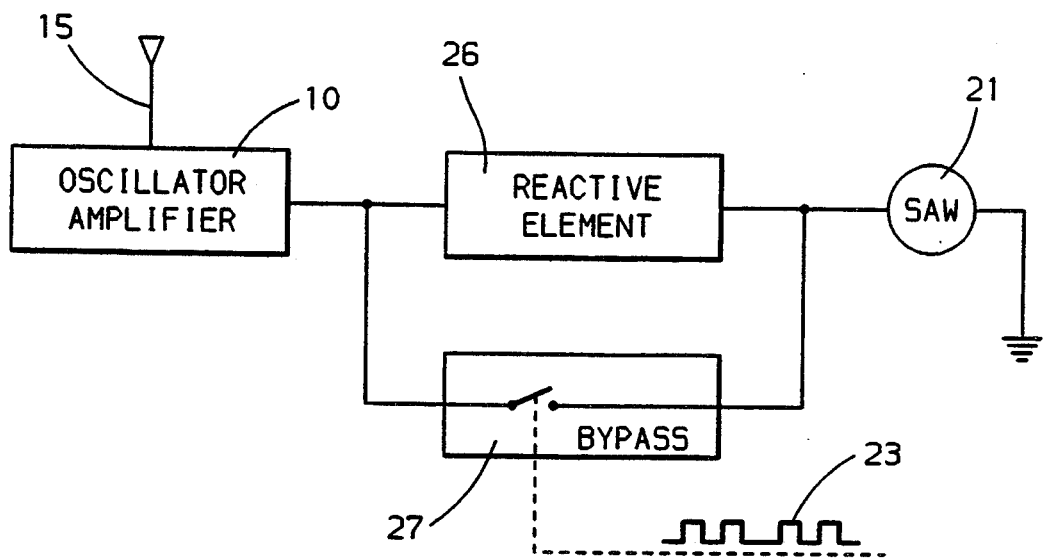
FIG. 1 shows a block diagram of an FSK modulator according to the present invention.

Referring first to FIG. 1, a block diagram is shown embodying the main features of the present invention. RF oscillator amplifier 10 has antennae 15 which is caused to oscillate at a frequency equal to that of RF oscillator amplifier 10. SAW transducer 21 is shown relative to ground at one terminal thereof with the output terminal coupled to one end of the parallel combination of reactive element 26 and bypass 27 illustrated as a switch. The other end of the parallel combination is coupled to the input of RF oscillator amplifier 10. Data stream 23 represents logic states controlling the state of bypass 27—closed or open. FIG. 1 illustrates the alternate arrangement of a reactive path to ground from RF oscillator amplifier 10 through a) the combination of reactive element 26 and SAW transducer 21 or b) directly through SAW transducer 21 in circumvention of reactive element 26 via bypass 27. Resulting output on antennae 15 is two distinct and independent frequencies, one for each logic state of data stream 23.

Figure 2:
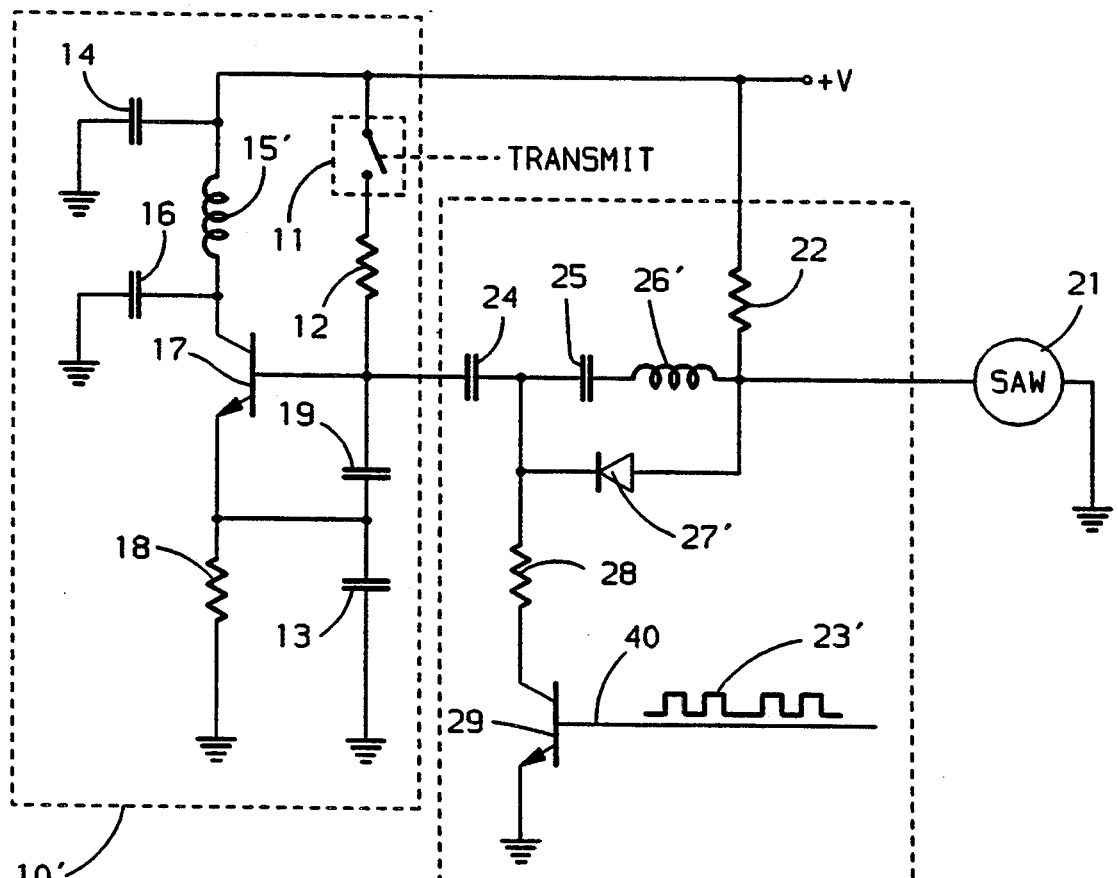
FIG. 2 shows a schematic diagram of a preferred embodiment according to the present invention.

FIG. 2 illustrates a preferred circuital embodiment of the invention. Primed numbers identify portions of FIG. 2 which are functional equivalents of the same non-primed numbers of FIG. 1. Power (+V) and ground are illustrated and correspond to a low voltage DC power source. A single 3 volt watch or similar disc like disposable battery is sufficient and preferred. RF oscillator amplifier 10' is preferably a Colpitts type oscillator and is illustrated as such. A Colpitts oscillator is preferred because of its broad oscillation range and therefore its ability to match readily with SAW transducers which natural oscillatory frequencies tend to vary more widely than other oscillator elements. Colpitts oscillators are also relatively inexpensive due to use of capacitive elements as opposed to inductive elements in the oscillatory loop. The particular embodiment shown as RF oscillator amplifier 10' utilizes a single transistor 17 to perform the multiple tasks of stable oscillatory switching and amplification sufficient to drive antennae 15' to a readily detectable output level. Antennae 15' is preferably a trace of metal patterned on a circuit board to provide a degree of inductance. In this exemplary embodiment, the inductance of antennae 15' is nominally 75 nH. Antennae 15' is coupled at one end thereof to both the power terminal of the power supply and a first terminal of decoupling capacitor 14, and at the other end thereof to the collector of transistor 17. A second terminal of decoupling capacitor 14 is coupled to ground. Decoupling capacitor 14, nominally 270 pF provides for decoupling of the generated RF signals from the power terminal of the battery during RF generation. Resistor 12, nominally 20 kΩ, is coupled in series with normally open switch 11 between the power terminal of the battery and the base of transistor 17 to provide bias for oscillator operation. Normally open switch 11 is closed when transmitting since at other times oscillation bias is not desirable and would unnecessarily reduce battery life. Other functionally equivalent means of providing bias voltage to the base of transistor 17 may include supplying a high logic level signal thereto when transmitting is initiated. Voltage dividing capacitors 13 and 19 are nominally 5.6 pF and 3.9 pF respectively and capacitor 16 (used to control gain and amplitude peaking) is nominally between 1 and 5 pF. Antennae 15', capacitor 16, transistor 17, voltage divider configured capacitors 13,19 comprise the essential oscillatory elements of RF oscillator amplifier 10' and, as specified, will support oscillation broadly centered around 300 MHz. A remaining low impedance signal path back from the base of transistor 17 to ground is provided and controlled external RF oscillator amplifier 10' via dashed block 20 and establishes the precise oscillation frequency.

Still with reference to FIG. 2, dashed block 20 shows a pair of selectable low impedance signal path from the base of transistor 17 to ground. A high logic level from data stream 23' on data line causes transistor switch 29 to turn on resulting in a forward biased PIN diode 27' through bias resistors 22 and 28. With PIN diode 27' conducting, inductor 26' is bypassed as a circuital element and the effective low impedance signal path is through SAW transducer 21'. SAW transducer 21' has a natural stand-alone resonant frequency of nominally 300 MHz consistent with the Colpitts oscillator central frequency. Capacitor 24 is nominally 27 pF and provides for DC blocking but has no consequential effect upon the oscillatory loop. A low logic level on data line 23' causes transistor switch 29 to turnoff resulting in a non-conducting PIN diode 27'. With PIN diode 27' not conducting, inductor 26' in combination with SAW transducer is the effective low impedance signal path. Capacitor 25 is nominally 27 pF and just like capacitor 24 provides for DC blocking with no consequential effect upon the oscillatory loop. Biasing resistors 22 and 28, both nominally 430 ohms, provide sufficient biasing voltages for block 20 elements with minimal power dissipation for extended battery life.

It is noted that in order to generate two distinct frequencies, only a single reactive component for frequency pulling need be employed according to the present invention. The SAW natural resonant frequency is utilized as one of the two frequencies while the other frequency is caused by the combination of the SAW transducer and the single reactive component. This arrangement allows for maximum spread between the two frequencies which in turn simplifies detection thereof and reduces difficulty in frequency discrimination. A greater amount of drift is thereby tolerable with such a design due to the relaxed detection accuracy required.

The embodiments of the invention in which an exclusive property or privilege is claimed are defined as follows:

1. A low-power Frequency Shift Keying (FSK) modulating circuit comprising:

a voltage source having power and ground terminals;

a Radio Frequency (RF) oscillator amplifier having an input port;

a Surface Acoustic Wave (SAW) transducer having an output port;

an inductor having first and second terminals, said first terminal coupled to said input port of the RF oscillator amplifier and said second terminal coupled to said output port of the SAW transducer and to said power terminal of the voltage source;

a Positive Intrinsic Negative (PIN) switching diode having an anode and a cathode, said anode coupled to said second terminal of the inductor, to said output port of the SAW transducer and to said power terminal of the voltage source, said cathode coupled to said first terminal of the inductor and to said input port of the RF oscillator amplifier; and a transistor switch having a base, an emitter and a collector, said collector being coupled to said input port of the RF oscillator amplifier, to said first terminal of the inductor and to said cathode of the PIN switching diode, and said emitter being coupled to said ground terminal of the voltage source;

whereby a high logic signal applied to the base causes oscillation at a first frequency determined by the SAW transducer independent of the inductor and a low logic signal applied to the base causes oscillation at a second frequency determined by the combination of the SAW transducer and the inductor.

* * * * *